April 14, 1959     T. O. BRANDON     2,882,058
GOLF BALL
Filed Feb. 11, 1958
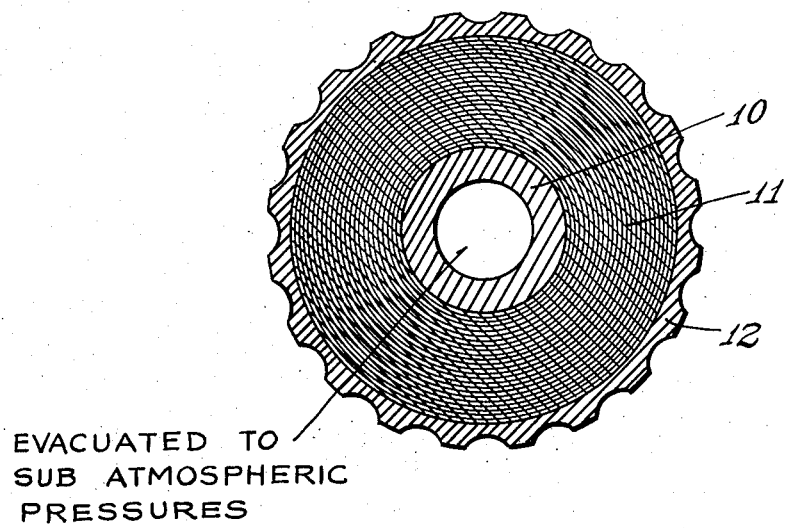
EVACUATED TO
SUB ATMOSPHERIC
PRESSURES
INVENTOR.
*Thomas O. Brandon*
BY
*Johnson and Kline*
ATTORNEYS

United States Patent Office 2,882,058
Patented Apr. 14, 1959

2,882,058

GOLF BALL

Thomas O. Brandon, Cucamonga, Calif., assignor to A. G. Spalding & Bros., Inc., Chicopee, Mass., a corporation of Delaware Application February 11, 1958, Serial No. 714,543

4 Claims. (Cl. 273—230)

The present invention relates to golf balls and more particularly to golf balls having a core which is less reactive to high impact forces.

It is an object of the present invention to provide a golf ball which can be regulated to control the distance obtained by a hard-hitting, long-driving player without seriously affecting the normal distance obtained by the average golfer and without losing the compression and hardness rating of the ball with the resulting click upon contact with the club, and without affecting the ball in play on short shots and on the green.

This is accomplished, according to the present invention, by providing a golf ball having a hollow core of resilient impervious material and by applying over the core the usual tensioned winding and enclosing the same in the usual cover, the hollow core of the ball, however, enclosing a vacuum or being evacuated to a sub-atmospheric pressure. With this construction the blow of an average golfer will react with the windings and the core without appreciably distorting the walls thereof to produce a normal shot. However, the force resulting from a blow produced by an abnormally hard-hitting, long-driving player will cause a deflection of the walls of the core, but since there is no material within the core to be compressed by this blow it will absorb some of the force and have, in effect, a deadening action on the ball to reduce the length of the drive over that which would normally be achieved had the normal filled core been used.

Other features and advantages of the invention will be apparent from the specification and claims when considered in connection with the accompanying drawing in which:

The drawing shows a sectional view of the golf ball of the present invention.

As shown in the drawing, the ball of the present invention comprises a hollow core 10 which is evacuated so as to produce a sub-atmospheric pressure or a vacuum therein. At present, the preferred vacuum is between 15 and 25 inches of mercury. The hollow core is an impervious core and can be made from resilient elastomeric material (such as rubber—natural or synthetic—or thermoplastic resins which may be molded under heat and pressure, for example, polyethylene, polyamides, vinyl polymers, copolymers and the like, the particular requirement of the ball determining the composition thereof) or other similar material suitable for this purpose. If the material is not impervious, it may be coated with the usual impervious coatings (not shown) on its inner or outer wall surfaces to render the wall impervious so that there will be no leakage into the core to disturb the sub-atmospheric pressure or vacuum within the core.

As will be noted, the walls of the core are of a suitable thickness to render them self-sustaining even with the vacuum within the core and may include, in order to maintain the weight of the ball, suitable weighting materials such as litharge or the like.

Around the core is wound the usual tensioned winding 11 of rubber (natural or synthetic) or other suitable elastomeric material so as to provide a firm, hard, outer resilient layer having predetermined compression rating and hardness as is present in a usual golf ball of high quality. Over this is molded the usual cover 12 formed from the usual cover materials.

With this construction it will be seen that when struck by a moderate blow as produced by an average golfer, the force of the blow will be such as not to appreciably distort the core so that the vacuum core will have but a negligible effect on the distance. Further, the ball will have the normal hardness and compression ratings so that when struck by an average player it will have the feel and usual click or sound and produce the normal reaction and result in the distance normally achieved by the player and will permit the ball to be played on short shots and on the green without any appreciable effects. However, when the ball is struck by a hard-hitting, long-driving player, the abnormal force of the club against the ball will be transmitted to the center and inasmuch as the center contains a void, there will be no material to compress within the hollow core and the restitution of the core will depend entirely on the resilient material of the core. Hence, the action of the core will be such as to absorb some of the force of the blow and deaden it so that the ball will not go a comparatively greater distance than that played by the normal golfer. By regulating the resiliency of the core walls and by varying the extent of evacuation of the core, the deadening effect of the core under high impact forces can be regulated.

In making the ball the usual winding and covering operations can be carried out and the core sections can be molded and assembled as usual. The novel step in the method, i.e., evacuation of the core, can take place before or after the winding operation. Thus the ball can be produced with a minimum variation with respect to existing operations and equipment.

Variations and modifications may be made within the scope of the claims and portions of the improvements may be used without others.

I claim:

1. A golf ball having a hollow, resilient, impervious core member, a tensioned winding on the core member, and a cover disposed around said winding, the walls of said hollow core member being self-sustaining and enclosing a vacuum.

2. A golf ball having a hollow, resilient, impervious core member provided with self-sustaining walls, a tensioned winding of elastomeric material wound on the core member, and a cover disposed around and enclosing said winding, said hollow core member enclosing a vacuum and being adapted to absorb some of the force of an abnormally high impact on the ball by a golf club, whereby the travel of the ball under said abnormally high impact is relatively reduced.

3. In a golf ball having a hollow, resilient core member, a tensioned winding on the core member, and a cover disposed around said winding, the improvement wherein said hollow core member is evacuated to a sub-atmospheric pressure and wherein the walls of the hollow core member are self-sustaining when the member is evacuated.

4. In a golf ball having a hollow, resilient core member of impervious elastomeric material, a tensioned winding of elastomeric material enclosing the core member, and a cover disposed around said winding, the improvement wherein said hollow core member is evacuated to have a vacuum therein of between 15 to 25 inches of mercury and wherein the walls of the hollow core member are self-sustaining when the member is evacuated.

References Cited in the file of this patent

UNITED STATES PATENTS

| | | |
|---|---|---|
| 1,981,959 | Landreth | Nov. 27, 1934 |
| 2,278,649 | Dickson et al. | Apr. 7, 1942 |
| 2,360,090 | Wilhelm | Oct. 10, 1944 |